US012576725B2

(12) United States Patent
Hara et al.

(10) Patent No.: US 12,576,725 B2
(45) Date of Patent: Mar. 17, 2026

(54) BATTERY ELECTRIC VEHICLE AND VEHICLE MANAGEMENT SYSTEM

(71) Applicant: TOYOTA JIDOSHA KABUSHIKI KAISHA, Toyota (JP)

(72) Inventors: Yoshikazu Hara, Atsugi (JP); Tomio Yamanaka, Nagoya (JP); Hiroshi Hiraiwa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 18/765,673

(22) Filed: Jul. 8, 2024

(65) Prior Publication Data

US 2025/0170903 A1 May 29, 2025

(30) Foreign Application Priority Data

Nov. 27, 2023 (JP) ................................. 2023-200240

(51) Int. Cl.
*B60Q 5/00* (2006.01)
*B60L 15/20* (2006.01)
*G10K 15/02* (2006.01)
*H04R 1/02* (2006.01)
*H04R 3/12* (2006.01)

(52) U.S. Cl.
CPC .............. *B60L 15/20* (2013.01); *B60Q 5/008* (2013.01); *G10K 15/02* (2013.01); *H04R 1/025* (2013.01); *H04R 3/12* (2013.01); *B60L 2250/26* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 9,096,165 B2 * | 8/2015 | Grosse-Budde | ......... | G10K 9/22 |
| 2007/0182525 A1 * | 8/2007 | McCarthy | .............. | G10K 15/02 |
| | | | | 340/425.5 |
| 2010/0208915 A1 * | 8/2010 | Lipp | ...................... | G10K 15/02 |
| | | | | 381/86 |
| 2012/0081222 A1 * | 4/2012 | Tamaki | .................. | G10K 15/02 |
| | | | | 340/466 |

(Continued)

FOREIGN PATENT DOCUMENTS

| | | | | |
|---|---|---|---|---|
| JP | 2011-213273 A | 10/2011 | | |
| JP | 2022-036005 A | 3/2022 | | |
| WO | WO-2023219144 A1 * | 11/2023 | ............... | A47C 7/38 |

*Primary Examiner* — James M Mcpherson

(74) *Attorney, Agent, or Firm* — SoraIP, Inc.

(57) ABSTRACT

A battery electric vehicle includes a speaker including an in-vehicle speaker that outputs a sound to the inside of the vehicle and an outside speaker that outputs sound to the outside of the vehicle. The battery electric vehicle further includes one or more processors configured to generate a pseudo engine sound and output the pseudo engine sound from a speaker mounted on the battery electric vehicle. When a vehicle speed of the battery electric vehicle is higher than a first speed, the one or more processors output the pseudo engine sound from the in-vehicle speaker, but not from the outside speaker. When the vehicle speed of the battery electric vehicle is equal to or lower than the first speed, the one or more processors output the pseudo engine sound from both the in-vehicle speaker and the outside speaker.

3 Claims, 5 Drawing Sheets

(56)  References Cited

U.S. PATENT DOCUMENTS

| | | | | |
|---|---|---|---|---|
| 2012/0083958 A1* | 4/2012 | Ballard | ................ | B60W 50/10 |
| | | | | 701/56 |
| 2012/0232769 A1* | 9/2012 | Nyu | ........................ | B60Q 5/00 |
| | | | | 701/101 |
| 2012/0257763 A1* | 10/2012 | Bowden | .......... | G10K 11/17823 |
| | | | | 381/71.4 |
| 2012/0293318 A1* | 11/2012 | Saito | ...................... | B60Q 9/00 |
| | | | | 340/463 |
| 2012/0296520 A1* | 11/2012 | Saito | ...................... | B60Q 1/22 |
| | | | | 701/36 |
| 2012/0299716 A1* | 11/2012 | Yoshino | .................. | B60Q 1/22 |
| | | | | 340/463 |
| 2012/0299717 A1* | 11/2012 | Yoshino | .................. | B60Q 9/00 |
| | | | | 340/466 |
| 2012/0299718 A1* | 11/2012 | Yoshino | .................. | B60Q 9/00 |
| | | | | 340/466 |
| 2013/0009769 A1* | 1/2013 | Saito | ...................... | B60Q 5/008 |
| | | | | 340/466 |
| 2013/0114827 A1* | 5/2013 | Lee | ........................ | B60Q 5/008 |
| | | | | 381/86 |
| 2018/0001818 A1* | 1/2018 | Reilly | .................... | B60Q 5/005 |
| 2019/0256101 A1* | 8/2019 | Roggenkamp | ...... | B60W 40/068 |
| 2019/0385584 A1* | 12/2019 | Han | ................ | G10K 11/17823 |
| 2020/0238902 A1* | 7/2020 | Pyzik | .................... | B60Q 5/008 |
| 2020/0314540 A1* | 10/2020 | Konno | .............. | B60R 11/0217 |
| 2022/0001751 A1* | 1/2022 | Umetsu | .................. | B62D 1/046 |
| 2022/0041067 A1* | 2/2022 | Isami | ...................... | B60L 15/20 |
| 2022/0185179 A1* | 6/2022 | Kim | ...................... | G10K 15/02 |
| 2023/0145186 A1* | 5/2023 | Orzechowski | ......... | B60Q 5/008 |
| | | | | 340/425.5 |
| 2023/0146799 A1* | 5/2023 | Kim | ...................... | B60Q 5/006 |
| | | | | 340/425.5 |
| 2023/0356603 A1* | 11/2023 | Hirao | .................... | B60W 10/08 |
| 2024/0067084 A1* | 2/2024 | Menne | .................... | H04R 3/14 |
| 2024/0083259 A1* | 3/2024 | Ikezawa | ................. | B60L 15/20 |

* cited by examiner

BATTERY ELECTRIC VEHICLE AND VEHICLE MANAGEMENT SYSTEM

CROSS-REFERENCE TO RELATED APPLICATION

This application claims priority to Japanese Patent Application No. 2023-200240 filed on Nov. 27, 2023, incorporated herein by reference in its entirety.

BACKGROUND

1. Technical Field

The present disclosure relates to battery electric vehicles including an electric motor as a driving source.

2. Description of Related Art

Japanese Unexamined Patent Application Publication No. 2022-036005 (JP 2022-036005 A) discloses a control device for a vehicle. This control device generates, in an actual vehicle including an electric motor (rotating electrical machine) as a driving source, a pseudo engine sound (virtual sound) that is generated when a virtual vehicle including a virtual engine as a driving source travels. Another document describing the technical level of the technical field of the present disclosure is Japanese Unexamined Patent Application Publication No. 2011-213273 (JP 2011-213273 A).

SUMMARY

The driving sound of an electric motor of a battery electric vehicle is low, and the running sound of the battery electric vehicle is particularly quiet when it is traveling at low speeds. Accordingly, surrounding people may not notice the presence of the battery electric vehicle when it is traveling at low speeds. Battery electric vehicles are therefore desired to notify surrounding people of their approach when they are traveling at low speeds.

A pseudo engine sound has drawn attention as it can give a driver a realistic feeling as if he or she were driving a vehicle including an internal combustion engine as a driving source (engine vehicle). An engine sound generated by an actual engine vehicle is heard outside the vehicle and therefore has a function to notify surrounding people of the approach of the vehicle. However, it has not been sufficiently considered to control output of the pseudo engine sound while taking also this function into account. The pseudo engine sound output to the outside of the vehicle may be mere noise depending on the situation.

One object of the present disclosure is to provide a battery electric vehicle that can appropriately control a pseudo engine sound to be output to the inside and outside of the vehicle while taking both its function for a driver and its function for surrounding people into account.

A first aspect relates to a battery electric vehicle that uses an electric motor as a traction power unit.

The battery electric vehicle includes a speaker including an in-vehicle speaker that outputs a sound to inside of the battery electric vehicle and an outside speaker that outputs a sound to outside of the battery electric vehicle.

The battery electric vehicle further includes one or more processors configured to generate a pseudo engine sound and output the pseudo engine sound from the speaker.

When a vehicle speed of the battery electric vehicle is higher than a first speed, the one or more processors output the pseudo engine sound from the in-vehicle speaker, but not from the outside speaker.

When the vehicle speed of the battery electric vehicle is equal to or lower than the first speed, the one or more processors output the pseudo engine sound from both the in-vehicle speaker and the outside speaker.

A second aspect relates to a vehicle management system applied to a battery electric vehicle that uses an electric motor as a traction power unit.

The vehicle management system includes one or more processors configured to generate a pseudo engine sound and output the pseudo engine sound from a speaker mounted on the battery electric vehicle.

The speaker mounted on battery electric vehicle includes an in-vehicle speaker that outputs a sound to inside of the battery electric vehicle and an outside speaker that outputs a sound to outside of the battery electric vehicle.

When a vehicle speed of the battery electric vehicle is higher than a first speed, the one or more processors output the pseudo engine sound from the in-vehicle speaker, but not from the outside speaker.

When the vehicle speed of the battery electric vehicle is equal to or lower than the first speed, the one or more processors output the pseudo engine sound from both the in-vehicle speaker and the outside speaker.

According to the present disclosure, when the vehicle speed of the battery electric vehicle is higher than the first speed, the pseudo engine sound is output from the in-vehicle speaker, but not from the outside speaker. When the vehicle speed of the battery electric vehicle becomes equal to or lower than the first speed, the pseudo engine sound is output from both the in-vehicle speaker and the outside speaker. This can give the driver a realistic feeling as if he or she were driving an engine vehicle. It is also possible to notify surrounding people of the approach of the battery electric vehicle by the pseudo engine sound when the battery electric vehicle is traveling at low speeds equal to or lower than the first speed. When the vehicle speed of the battery electric vehicle is higher than the first speed, the pseudo engine sound is not output from the outside speaker. The pseudo engine sound is therefore less likely to become mere noise.

In particular, the pseudo engine sound output from the outside speaker is also output from the in-vehicle speaker. Moreover, the pseudo engine sound is continuously output from the in-vehicle speaker before and after the pseudo engine sound starts being output from the outside speaker. Accordingly, even when the pseudo engine sound starts being output from the outside speaker, the driver can continue to drive naturally without feeling strange.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described with reference to the accompanying drawings.

1. Battery Electric Vehicle and Vehicle Management System

Figure 1:
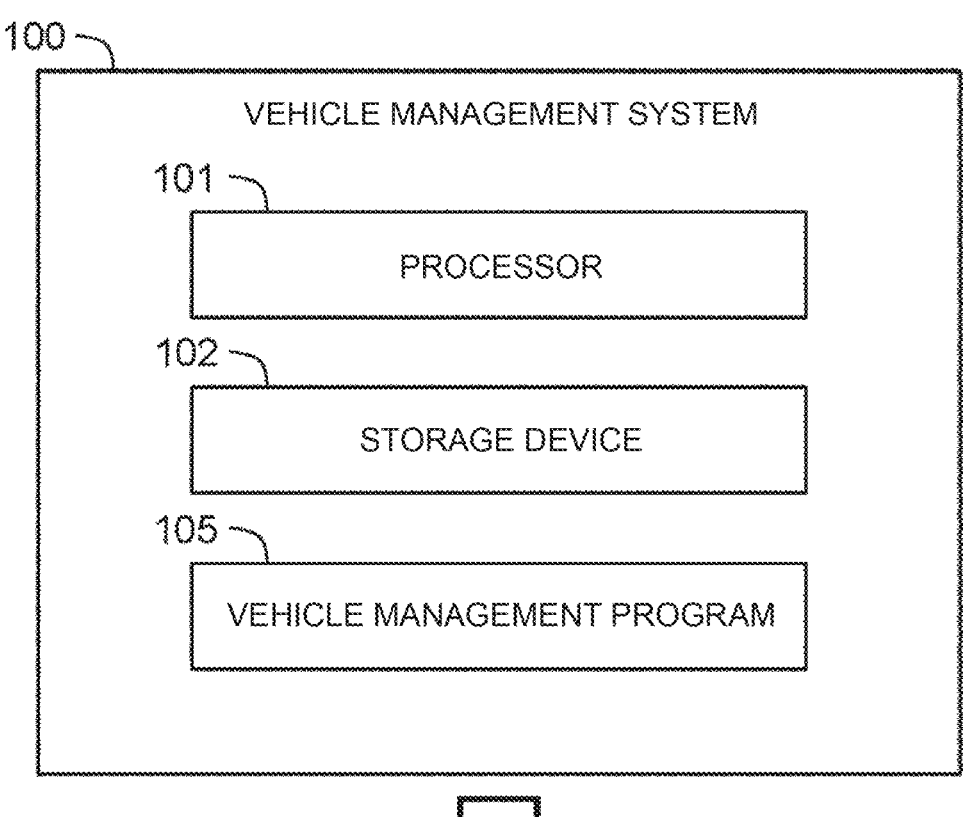
FIG. 1 is a conceptual diagram illustrating a battery electric vehicle and a vehicle management system according to an embodiment.
Figure 1:
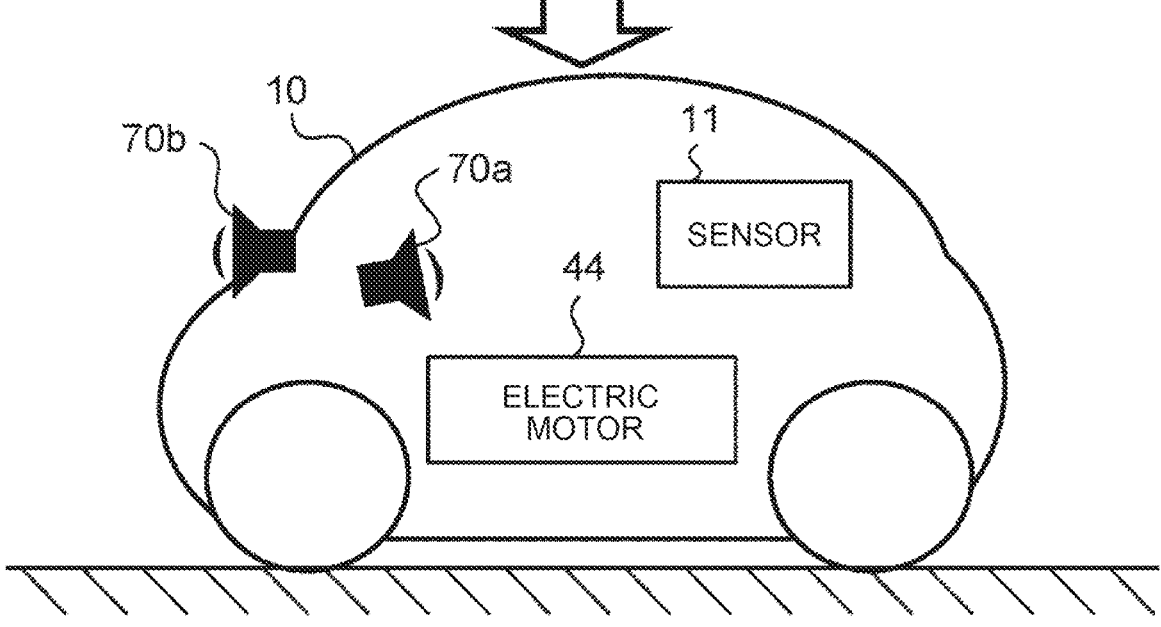

FIG. 1 is a conceptual diagram illustrating a battery electric vehicle 10 and a vehicle management system 100 according to the present embodiment. The battery electric vehicle 10 includes an electric motor 44. Examples of the electric motor 44 include a brushless DC motor and a three-phase AC synchronous motor. The battery electric vehicle 10 uses the electric motor 44 as a traction power unit.

Battery electric vehicle 10 includes various sensors 11. The various sensors 11 detect the driving state of battery electric vehicle 10. Examples of the various sensors 11 include an accelerator position sensor, a brake position sensor, a wheel speed sensor, an acceleration sensor, a rotation speed sensor, a position sensor, and a noise meter. The accelerator position sensor detects an operation amount of the accelerator pedal. The brake position sensor detects an operation amount of the brake pedal. The wheel speed sensor detects a rotational speed of a wheel of battery electric vehicle 10. The acceleration sensor detects lateral acceleration and longitudinal acceleration of battery electric vehicle 10. The rotational speed sensor detects the rotational speed of the electric motor 44. The position sensor detects the position of battery electric vehicle 10. Examples of the position sensor include a global navigation satellite system (GNSS) sensor. The noise meter measures the noise around battery electric vehicle 10.

Further, battery electric vehicle 10 is equipped with a speaker. The speaker mounted on battery electric vehicle includes an in-vehicle speaker 70a that outputs a sound to the inside of the battery electric vehicle 10, and an outside speaker 70b that outputs a sound to the outside of the battery electric vehicle 10.

The vehicle management system 100 is applied to such a battery electric vehicle 10 and manages battery electric vehicle 10. The vehicle management system 100 has at least a function as a sound management system that manages sounds related to battery electric vehicle 10. In particular, the vehicle management system 100 generates and manages sounds output from a speaker mounted on battery electric vehicle 10. In addition, the vehicle management system 100 outputs the generated sound through a speaker mounted on battery electric vehicle 10.

The entire vehicle management system 100 may be mounted on a battery electric vehicle 10. As another example, at least a portion of the vehicle management system 100 may be included in a management server external to battery electric vehicle 10. In such cases, the vehicle management system 100 may remotely manage sounds related to battery electric vehicle 10. As another example, the vehicle management system 100 may be distributed between battery electric vehicle 10 and the management server.

Generally speaking, the vehicle management system 100 includes one or more processors 101 (hereinafter simply referred to as processors 101) and one or more storage devices 102 (hereinafter simply referred to as storage devices 102). The processor 101 executes various processes. Exemplary processors 101 include general purpose processors, special purpose processors, central processing unit (CPU), graphics processing unit (GPU), application specific integrated circuit (ASIC), field-programmable gate array (FPGA), integrated circuits, conventional circuits, and/or combinations thereof. The processor 101 may also be referred to as circuitry or processing circuitry. Circuitry is hardware programmed to implement the described functions, or hardware that performs the functions. The storage device 102 stores various types of information. Examples of the storage device 102 include volatile memory, nonvolatile memory, hard disk drive (HDD), solid state drive (SSD), and the like. The functions of the vehicle management system 100 are realized by the cooperation of the processor 101 and the storage device 102.

One or more vehicle management programs 105 (hereinafter simply referred to as vehicle management programs 105) are computer programs executed by the processor 101. The functions of the vehicle management system 100 may be realized by cooperation of the processor 101 executing the vehicle management program 105 and the storage device 102. The vehicle management program 105 is stored in the storage device 102. Alternatively, the vehicle management program 105 may be recorded in a computer-readable recording medium.

2. Output of Pseudo Engine Sound 2.1 Overview

The vehicle management system 100 according to the present embodiment generates a "pseudo engine sound" that simulates an engine sound generated in a vehicle (engine vehicle) having an internal combustion engine as a drive source, in a function as a sound management system. Then, the vehicle management system 100 outputs a pseudo engine sound through a speaker mounted on battery electric vehicle 10.

The battery electric vehicle 10 includes an in-vehicle speaker 70a and an outside speaker 70b. The pseudo engine sound output from the in-vehicle speaker 70a is transmitted to the inside of the vehicle, and is heard by at least the driver. Therefore, by outputting the pseudo engine sound from the in-vehicle speaker 70a, it is possible to give the driver a realistic feeling as if he or she were driving an engine vehicle.

On the other hand, the pseudo engine sound output from the outside speaker 70b is transmitted to the outside of the vehicle, and is heard mainly by people around the battery electric vehicle 10. Engine sounds are vehicle specific sounds. For this reason, as can be considered in an actual engine vehicle, it is expected that a person who hears the pseudo engine sound recognizes that the vehicle is approaching from a direction in which the pseudo engine sound is heard. Therefore, by outputting the pseudo engine sound from the outside speaker 70b, it is possible to notify the nearby person of the approach of the vehicle. However, the pseudo engine sound output from the outside speaker 70b may be simply noise depending on circumstances.

The vehicle management system 100 is configured to output the pseudo engine sound from the in-vehicle speaker 70a or the outside speaker 70b in view of the respective functions described above. Hereinafter, the vehicle management system 100 as the sound management system will be described in detail.

2.2 Functional Configuration

Figure 2:
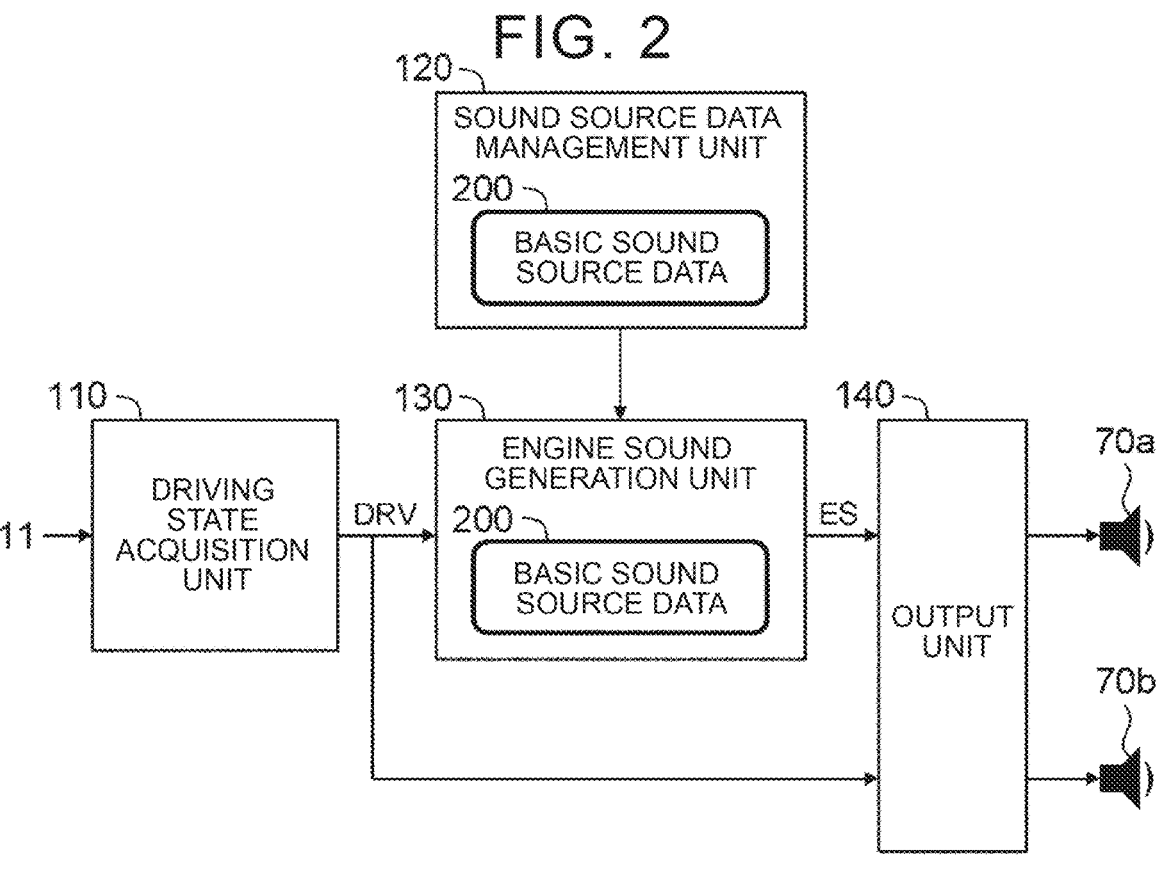
FIG. 2 is a block diagram showing the example of the functional constitution of a vehicles management system.

FIG. 2 is a block diagram illustrating a functional configuration of the vehicle management system 100 as the sound management system. The vehicle management system 100 includes, as functional blocks, a driving state acquisition unit 110, a sound source data management unit 120, an engine sound generation unit 130, and an output unit 140. These functional blocks may be realized by cooperation of the processor 101 executing the vehicle management program 105 and the storage device 102.

The driving state acquisition unit 110 acquires driving information DRV related to the battery electric vehicle 10. The driving information DRV includes information related to a driving operation performed by the driver, information related to a driving state of battery electric vehicle 10, and information related to a driving environment in which battery electric vehicle 10 is placed. Typically, the driving information DRV includes sensor detection information detected by the sensor 11 mounted on battery electric vehicle 10. For example, the sensor detection information includes an operation amount of the accelerator pedal (accelerator operation amount), an operation amount of the brake pedal (brake operation amount), a wheel speed, a vehicle speed, a longitudinal acceleration, a rotational speed of the electric motor 44, and battery electric vehicle 10 mapped positions. The sensor detected information may include the ambient noise level of battery electric vehicle 10.

The driving information DRV includes a virtual engine speed Ne. It is herein assumed that the battery electric vehicle 10 uses a virtual engine as a traction power unit. The virtual engine speed Ne is a rotational speed of the virtual engine when battery electric vehicle 10 is assumed to be driven by the virtual engine. For example, the driving state acquisition unit 110 may calculate the virtual engine speed Ne so as to increase as the wheel speed increases. In addition, when battery electric vehicle 10 includes a manual mode (MT mode) described later, the driving state acquisition unit 110 may calculate the virtual engine speed Ne in the manual mode on the basis of the wheel speed, the overall reduction ratio, and the slip ratio of the virtual clutch. The method for calculating the virtual engine speed Ne in the manual mode will be described later.

The sound source data management unit 120 stores and manages the basic sound source data 200 used for generating the pseudo engine sound. The sound source data management unit 120 is mainly implemented by one or more storage devices 102. Typically, the basic sound source data 200 includes a plurality of types of sound source data. The plurality of types of sound source data include, for example, sound source data of sound caused by engine combustion (for low rotational speed, medium rotational speed, and high rotational speed), sound source data of sound caused by a drive system such as a gear (for low rotational speed, medium rotational speed, and high rotational speed), sound source data of noise sound, and sound source data of event sound (e.g., gallium sound and engine stall sound). Each sound source data is generated in advance through a simulation based on an engine model and a vehicle model of the engine vehicle, or the like. Each sound source data is flexibly adjustable. That is, at least one of the sound pressure and the frequency of the sound indicated by the sound source data can be flexibly adjusted.

The engine sound generation unit 130 (engine sound simulator) is a simulator that generates a pseudo engine sound. The engine sound generation unit 130 acquires at least a part of the driving information DRV from the driving state acquisition unit 110. In particular, the engine sound generation unit 130 acquires information on the virtual engine speed Ne and the vehicle speed from the driving state acquisition unit 110. Further, the engine sound generation unit 130 reads the basic sound source data 200 from the sound source data management unit 120. Then, the engine sound generation unit 130 combines one or more pieces of sound source data included in the basic sound source data 200. As a result, the engine sound generation unit 130 generates a pseudo engine sound according to the driving state of the battery electric vehicle 10 (virtual engine speed Ne and vehicle speed). The engine sound data ES is data indicating the generated pseudo engine sound.

The generation of the pseudo engine sound is a well-known technique, and is not particularly limited in the present embodiment. For example, a pseudo engine sound may be generated by a well-known engine sound simulator employed in a game or the like. The virtual engine speed Ne-frequency map and the virtual engine torque-sound pressure map may be used, and the frequency of the pseudo engine sound may be increased or decreased in proportion to the virtual engine speed Ne, and the sound pressure may be increased or decreased in proportion to the virtual engine torque.

The output unit 140 receives the engine sound data ES generated by the engine sound generation unit 130. The output unit 140 further acquires information on the vehicle speed of the battery electric vehicle 10 as the driving information DRV from the driving state acquisition unit 110. The output unit 140 executes a process of outputting the pseudo engine sound based on the engine sound data ES from the in-vehicle speaker 70a or the outside speaker 70b. In this processing, the output unit 140 operates so as to make the speakers that output the pseudo engine sound different according to the vehicle speed.

Figure 3:
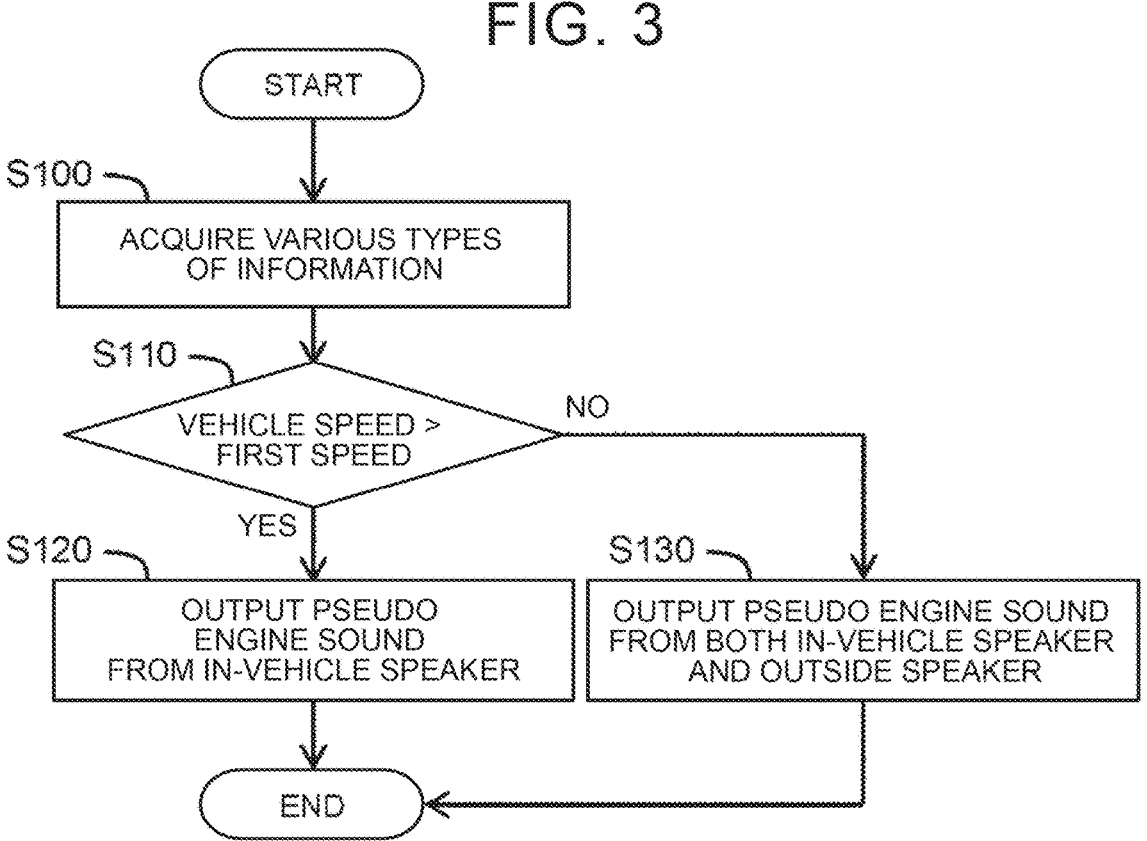
FIG. 3 is a flowchart illustrating a process executed by an output unit of the vehicle management system.

FIG. 3 is a flowchart illustrating a process executed by the output unit 140. The processing illustrated by the flowchart of FIG. 3 may be repeatedly executed at a predetermined processing cycle.

In S100, the output unit 140 acquires various types of data. In particular, the output unit 140 acquires the engine sound data ES from the engine sound generation unit 130. Further, the output unit 140 acquires the vehicle speed of the battery electric vehicle 10 from the driving state acquisition unit 110.

Next, in S110, the output unit 140 determines whether the vehicle speed of the acquired battery electric vehicle 10 is higher than the first speed or is equal to or lower than the first speed. The first speed provides a threshold at which battery electric vehicle 10 is determined to be traveling at low speeds. The specific value of the first speed may be suitably determined according to the environment to which the present embodiment is applied.

When the vehicle speed of battery electric vehicle 10 is higher than the first speed (S110; Yes), the output unit 140 outputs a pseudo engine sound based on the engine sound data ES from the in-vehicle speaker 70a (S120). In particular, at this time, the output unit 140 does not output the pseudo engine sound from the outside speaker 70b. After S120, the output unit 140 ends the current process.

When the vehicle speed of battery electric vehicle 10 becomes equal to or lower than the first speed (S110; No), the output unit 140 outputs a pseudo engine sound from both the in-vehicle speaker 70a and the outside speaker 70b (S130). After S130, the output unit 140 ends the current process.

As described above, the output unit 140 executes processing. According to the process executed by the output unit 140, when the vehicle speed of battery electric vehicle 10 is higher than the first speed, the pseudo engine sound is output toward the inside of the vehicle, but is not output toward the outside of the vehicle. When the vehicle speed of battery electric vehicle 10 becomes equal to or lower than the first speed and the battery electric vehicle 10 is traveling at low speeds, the pseudo engine sound is output toward both the inside and the outside of the vehicle.

2.3 Effect

As described above, according to the vehicle management system 100 of the present embodiment, when the vehicle speed of battery electric vehicle 10 is higher than the first speed, the pseudo engine sound is output from the in-vehicle speaker 70a. A pseudo engine sound is not output from the outside speaker 70b. When the vehicle speed of battery electric vehicle 10 becomes equal to or lower than the first speed, the pseudo engine sound is output from both the in-vehicle speaker 70a and the outside speaker 70b. In other words, the pseudo engine sound is output from the in-vehicle speaker 70a while battery electric vehicle 10 is traveling. On the other hand, the pseudo engine sound is output from the outside speaker 70b only when battery electric vehicle 10 is traveling at low speeds.

Accordingly, it is possible to give the driver a realistic feeling as if he or she were driving an engine vehicle while the battery electric vehicle 10 is traveling. Then, it is possible to notify surrounding people of the approach of the battery electric vehicle 10 by the pseudo engine sound when it is traveling at low speeds, namely when the running sound of the battery electric vehicle 10 becomes quiet. Further, when the vehicle speed of battery electric vehicle 10 increases, the output of the pseudo engine sound toward the outside of the vehicle is stopped, so that it is possible to prevent the pseudo engine sound from becoming a mere noise.

In particular, the pseudo engine sound output from the outside speaker 70b is also output from the in-vehicle speaker 70a. Moreover, the output of the pseudo engine sound from the in-vehicle speaker 70a is continuously performed before and after the start of the output of the pseudo engine sound from the outside speaker 70b. Therefore, even if the pseudo engine sound is started to be output from the outside speaker 70b, the driver can continue driving naturally without any discomfort. In addition, the driver can perform driving while recognizing a sound that may be heard by surrounding people.

The vehicle management system 100 may be further configured to notify the driver that the pseudo engine sound is being output from the outside speaker 70b. For example, the vehicle management system 100 notifies the driver by displaying or generating sounds via a HMI mounted on battery electric vehicle 10. By performing the notification in this way, the driver can recognize that the notification of the approach of the vehicle to the surrounding people is being performed.

2.4 Modification

The pseudo engine sound output from the outside speaker 70b differs in how they are heard to others, depending on the noise level around the battery electric vehicle 10. For example, even if the same pseudo engine sound is output, the pseudo engine sound heard by surrounding people is perceived to be small when the noise level is high, and the pseudo engine sound heard by surrounding people is perceived to be large when the noise level is low. For this reason, depending on the noise level around the battery electric vehicle 10, there is a possibility that the notification of the approach of the vehicle to surrounding people by the pseudo engine sound may not function effectively. For example, when the noise level is high, it is conceivable that the surrounding people cannot sense the pseudo engine sound. Further, for example, when the noise level is small, it is considered that the surrounding people feel that the pseudo engine sound is too loud.

Therefore, the output unit 140 further acquires information on the noise level around the battery electric vehicle 10 as the driving information DRV from the driving state acquisition unit 110. The output unit 140 may be configured to change a characteristic of the pseudo engine sound output from the outside speaker 70b according to the noise level.

Figure 4:
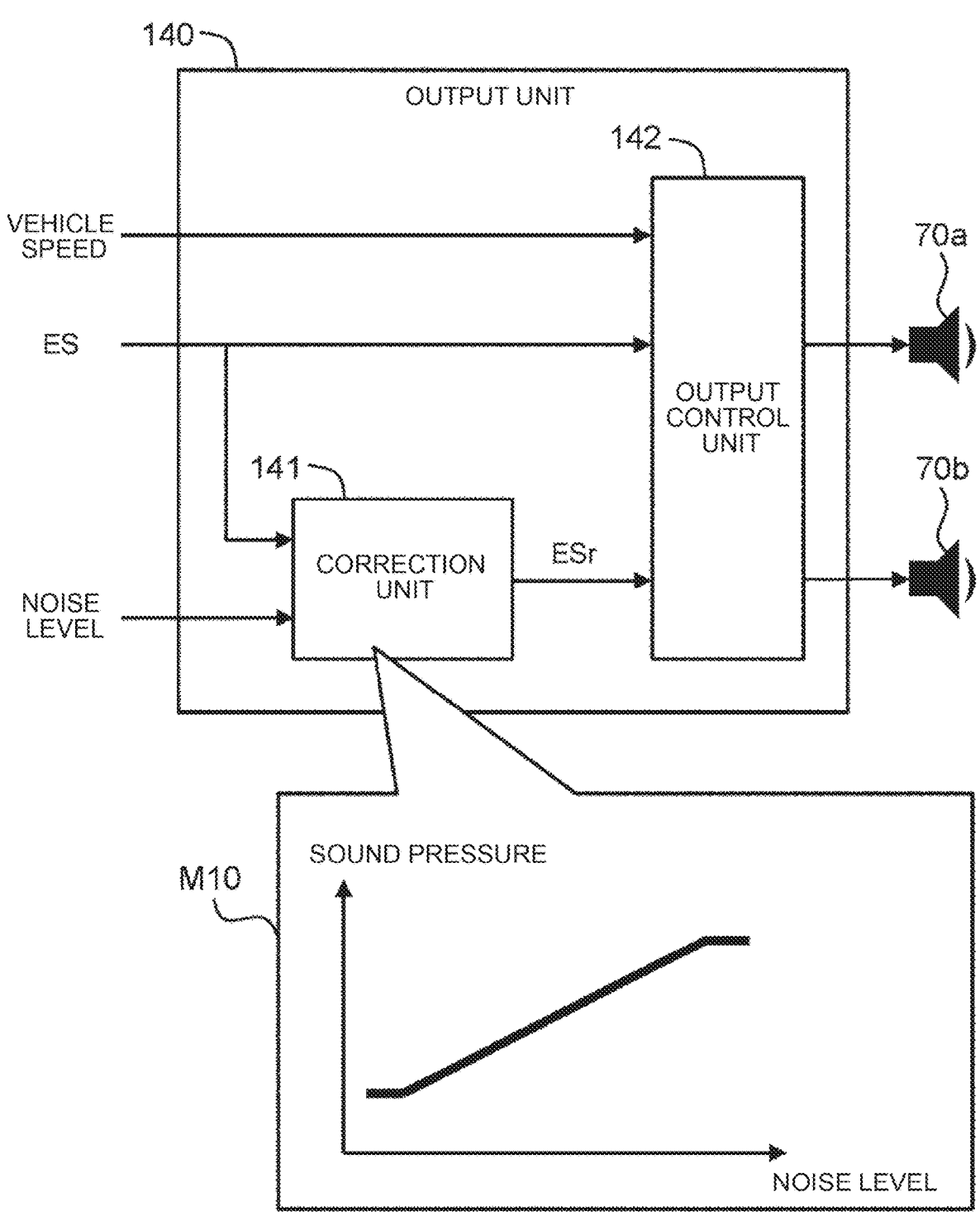
FIG. 4 is a block diagram illustrating an example of a functional configuration of an output unit according to a modification.

FIG. 4 is a block diagram illustrating a functional configuration of an output unit 140 according to a modification. In the example illustrated in FIG. 4, the output unit 140 includes a correction unit 141 and an output control unit 142.

The correction unit 141 receives the engine sound data ES generated by the engine sound generation unit 130 and the noise level around the battery electric vehicle 10. The correction unit 141 corrects the engine sound data ES according to the noise level. For example, the correction unit 141 corrects the engine sound data ES so as to change the sound pressure of the pseudo engine sound using the sound pressure map M10. The sound pressure map M10 is created such that the sound pressure of the pseudo engine sound increases as the noise level increases. In particular, the sound pressure map M10 may be configured to provide a sound pressure at which surrounding people can appreciably sense the pseudo engine sound with respect to the noise level. In addition, the correction unit 141 may correct the engine sound data ES so as to change the frequency and the tone color of the pseudo engine sound according to the noise level.

The output control unit 142 receives the vehicle speed of battery electric vehicle 10, the engine sound data ES generated by the engine sound generation unit 130, and the engine sound data ESr corrected by the correction unit 141. The processing in the output control unit 142 is equivalent to the processing described with reference to FIG. 3. However, the output control unit 142 outputs a pseudo engine sound based on the engine sound data ES from the in-vehicle speaker 70a, and outputs a pseudo engine sound based on the corrected engine sound data ESr from the outside speaker 70b.

As described above, according to the modification, the characteristic of the pseudo engine sound output from the outside speaker 70b changes according to the noise level around the battery electric vehicle 10. This makes it possible to adjust the pseudo engine sound output from the outside speaker 70b in particular so that surrounding people can sense it moderately with respect to the noise level. As a result, the notification of the approach of the vehicle to the surrounding people by the pseudo engine sound can be effectively performed.

2.5 Other

The vehicle management system 100 may be configured to generate other artificial sounds and output the artificial sounds from the speakers instead of the pseudo engine sounds. Examples of the artificial sound to be generated include a simulated driving sound simulating a driving sound of a moving body (for example, a train, an airplane, or the like) different from an automobile. As another example, the artificial sound may be music. The functional configuration of the vehicle management system 100 in this case can be similarly realized by appropriately replacing the "pseudo engine sound" in the above description with "artificial sound".

In this case, the artificial sound output from the in-vehicle speaker 70a is not intended to give the driver a realistic feeling as if he or she were driving an engine vehicle. Alternatively, the artificial sound output from the in-vehicle speaker 70a may provide entertainment to the driver.

In addition, the vehicle management system 100 may be configured such that the driver can select the sound output from the outside speaker 70b as a notification sound that differs from the pseudo engine sound. For example, the vehicle management system 100 is configured to receive a selection of a sound to be output from the outside speaker 70b from the driver via a HMI mounted on battery electric vehicle 10. The sound source data management unit 120 may be further configured to manage notification sound data. The content of the notification sound may be appropriately designed. For example, the notification sound includes an artificial sound that repeats sounds of a specific scale such as "pee, pee, . . . ". When the driver selects a notification sound other than the pseudo engine sound, the output unit 140 outputs a notification sound from the outside speaker 70b based on the data read from the sound source data management unit 120 when the vehicle speed of battery electric vehicle 10 becomes equal to or lower than the first speed.

3. Applications to Battery Electric Vehicle with Manual Mode (MT Mode)

An electric motor used as a traction power unit in a typical battery electric vehicle is significantly different in torque characteristics from an internal combustion engine used as a traction power unit in a conventional vehicle (CV). Due to differences in the torque characteristics of the power unit, CV requires a transmission, whereas battery electric vehicle generally does not include a transmission. Of course, a typical battery electric vehicle does not include a manual transmission (MT) that switches the gear ratio by manual operation of a driver. Therefore, driving of a conventional vehicle with a MT (hereinafter, referred to as a MT vehicle) and driving of a battery electric vehicle have a great difference in driving feeling.

On the other hand, the electric motor can relatively easily control the torque by controlling the applied voltage and field. Therefore, in the electric motor, it is possible to obtain a desired torque characteristic within the operating range of the electric motor by performing appropriate control. By taking advantage of this characteristic, the torque of battery electric vehicle can be controlled to simulate the torque characteristic peculiar to MT vehicles. In addition, a pseudo shifter may be provided in battery electric vehicle so that the driver can obtain a driving sensation such as a MT vehicle. As a result, MT vehicles can be simulated in battery electric vehicle.

That is, battery electric vehicle controls the power of the electric motor to simulate MT vehicle-specific torque characteristics. The driver operates the pseudo shifter to perform a pseudo manual shift operation. Responsive to the simulated manual shifting by the driver, battery electric vehicle simulates MT vehicles and changes their torque characteristics. As a result, the driver of battery electric vehicle can feel as if the driver were driving an MT vehicle. The control mode of the electric motor for simulating the torque characteristics and the manual shift operation of MT vehicles is hereinafter referred to as a "manual mode" or a "MT mode". Further, for the manual control mode (MT mode), a normal control mode for operating battery electric vehicle 10 as a common battery electric vehicle is hereinafter referred to as "automatic mode" or "EV mode".

The disclosed battery electric vehicle 10 may include such a manual mode (MT mode). The manual mode (MT mode) and the automatic mode (EV mode) may be switchable by the driver's selection. In the manual mode (MT mode), battery electric vehicle 10 generates a pseudo engine sound according to the driver's driving operation. Since not only driving operation of an MT vehicle but also engine sounds of MT vehicles are reproduced, the degree of satisfaction of drivers seeking reality is increased.

In particular, the vehicle management system 100 may be configured to stop outputting the pseudo engine sound from the in-vehicle speaker 70a when the automatic mode (EV mode) is selected. Further, when the automatic mode (EV mode) is selected, the vehicle management system 100 may be configured such that the sound output from the outside speaker 70b is a notification sound that differs from the pseudo engine sound. That is, when the vehicle speed of battery electric vehicle 10 is equal to or lower than the first speed, a notification sound is output from the outside speaker 70b. The content of the notification sound may be appropriately set. With this configuration, in the automatic mode (EV mode), the driver can drive battery electric vehicle 10 without listening to the engine sound from the in-vehicle speaker 70a. In addition, it is possible to notify the surrounding people of the approach of the vehicle by a normal notification sound when it is traveling at low speeds. In this way, the automatic mode (EV mode) also realizes the operation of a common battery electric vehicle with respect to the sound output from the speaker. As a result, the driver can enjoy driving battery electric vehicle 10 in the automatic mode (EV mode) without any discomfort.

Hereinafter, an exemplary configuration of a battery electric vehicle 10 including a manual mode (MT mode) will be described.

3.1 First Configuration Example (Sequential Shifter)

Figure 5:
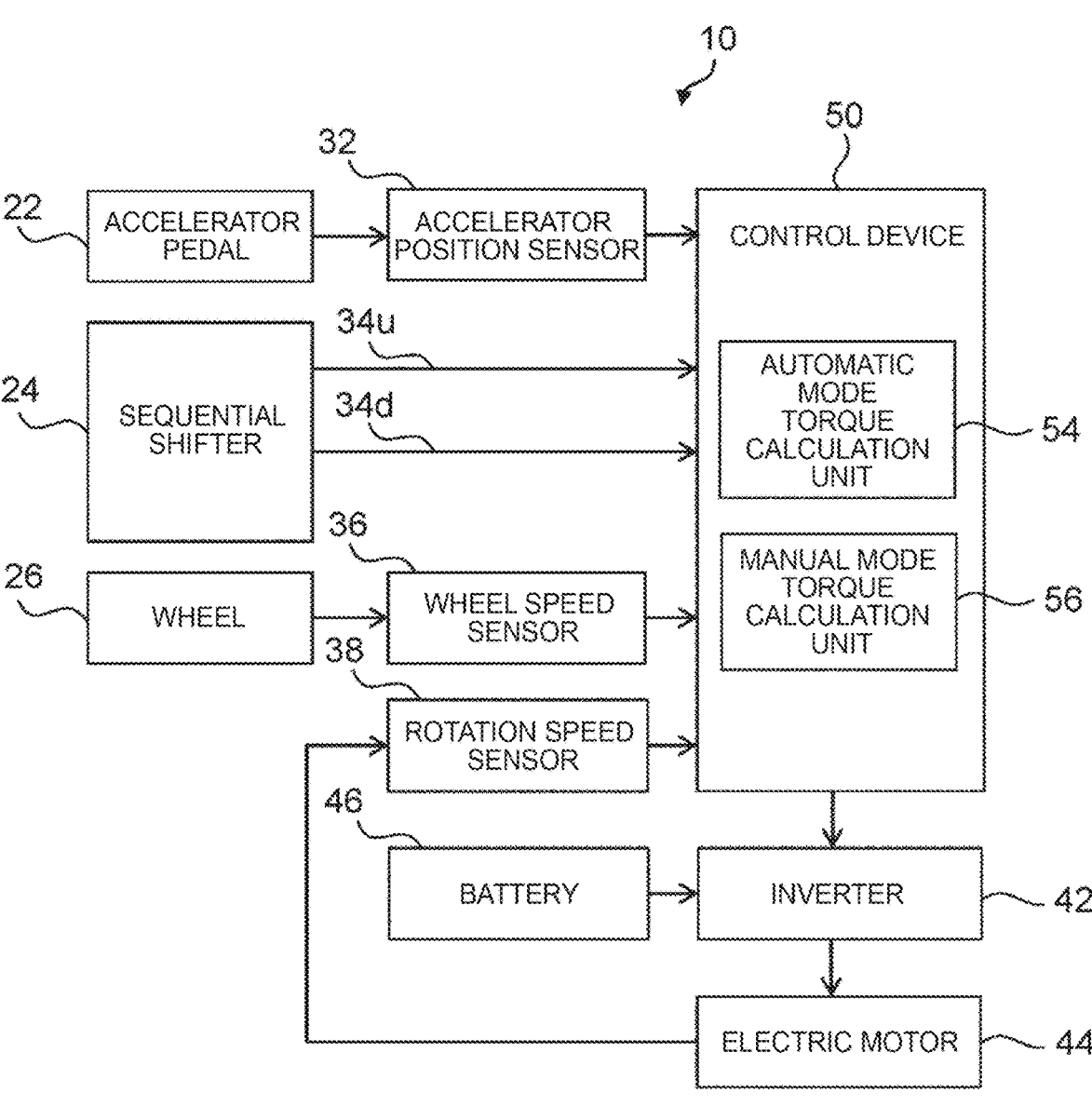
FIG. 5 is a block diagram illustrating a first configuration example of a power control system of battery electric vehicle.

FIG. 5 is a diagram illustrating a first configuration example of a power control system of battery electric vehicle 10 according to the present embodiment. The battery 46 stores electrical energy that drives the electric motor 44. That is, the battery electric vehicle 10 is a battery electric vehicle (BEV) that runs on electrical energy stored in the battery 46. The inverter 42 converts DC power input from the battery 46 into drive power of the electric motor 44 at the time of acceleration. In addition, the inverter 42 converts the regenerative power input from the electric motor 44 into DC power at the time of deceleration, and charges the battery 46.

The battery electric vehicle 10 includes an accelerator pedal 22 for the driver to enter an acceleration demand for battery electric vehicle 10. The accelerator pedal 22 is provided with an accelerator position sensor 32 for detecting an accelerator operation amount.

The battery electric vehicle 10 includes a sequential shifter 24. The sequential shifter 24 may be a paddle type shifter or a lever type pseudo shifter.

The paddle shifter is a different dummy than the original paddle shifter. The paddle shifter includes an upshift switch and a downshift switch for determining an operating position. The upshift switch is pulled forward to emit an upshift signal 34u, and the downshift switch is pulled forward to emit a downshift signal 34d.

On the other hand, the lever-type pseudo shifter is a dummy that is different from the original shifter, similarly to the paddle-type shifter. The pseudo shifter of the lever type is configured to output an upshift signal 34u by tilting the shift lever forward, and output a downshift signal 34d by tilting the shift lever backward.

Battery electric vehicle 10 wheel 26 is provided with a wheel speed sensor 36. The wheel speed sensor 36 is used as a vehicle speed sensor for detecting the vehicle speed of battery electric vehicle 10. Further, the electric motor 44 is provided with a rotation speed sensor 38 for detecting the rotation speed thereof.

Battery electric vehicle 10 includes a control device 50. The control device 50 is typically an electronic control unit (ECU) mounted on a battery electric vehicle 10. The control device 50 may be a combination of a plurality of ECU.

The control device 50 controls the electric motor 44 by PWM control of the inverter 42. The control device 50. A motor torque command for controlling PWM of the inverter 42 is calculated.

The control device 50 includes an automatic mode (EV mode) and a manual mode (MT mode) as control modes. The automatic mode is programmed to continuously change the output of the electric motor 44 in response to operation of the accelerator pedal 22. On the other hand, the manual mode is a control mode for driving battery electric vehicle 10 like MT vehicles. The manual mode is programmed to vary the output characteristics of the electric motor 44 for operation of the accelerator pedal 22 in response to upshift and downshift operations on the sequential shifter 24.

The control device 50 includes an automatic mode torque calculation unit 54 and a manual mode torque calculation unit 56. The units 54 and 56 may be independent ECU or ECU functions obtained by executing programs stored in memories on a processor.

The automatic mode torque calculation unit 54 has a function to calculate the motor torque when the electric motor 44 is controlled in the automatic mode. The automatic mode torque calculation unit 54 stores a motor torque command map. The motor torque command map is a map for determining the motor torque from the accelerator operation amount and the rotational speed of the electric motor 44. A signal of the accelerator position sensor 32 and a signal of the rotation speed sensor 38 are input to each parameter of the motor torque command map. The motor torque corresponding to these signals is output from the motor torque command map. Therefore, in the automatic mode, even if the driver operates the sequential shifter 24, the operation is not reflected in the motor torque.

The manual mode torque calculation unit 56 includes a MT vehicle model. MT vehicle model is a model for calculating the drive wheel torque that would be obtained by operating the accelerator pedal 22 and the sequential shifter 24 assuming that battery electric vehicle 10 is a MT vehicle.

The vehicle model includes an engine model, a clutch model, and a transmission model. The engine model calculates a virtual engine rotational speed and a virtual engine output torque. The virtual engine rotational speed is calculated from the wheel speed, the overall reduction ratio, and the slip ratio of the virtual clutch. The virtual engine output torque is calculated from the virtual engine rotational speed and the accelerator operation amount. In the calculation of the virtual engine output torque, a map that defines the relationship between the accelerator operation amount, the virtual engine rotational speed, and the virtual engine output torque is used.

The clutch model calculates a torque transmission gain. The torque transmission gain is a gain for calculating the torque transmission degree of the virtual clutch according to the virtual clutch opening degree. In the calculation of the torque transmission gain, a map defining a relationship between the virtual clutch opening degree and the torque transmission gain is used.

The clutch model calculates the clutch output torque by using the torque transmission gain. The clutch output torque is a torque output from the virtual clutch. Further, the clutch model calculates a slip ratio. The slip rate is used to calculate the virtual engine speed in the engine model. The slip ratio can be calculated using a map in which the slip ratio is given to the virtual clutch opening degree in the same manner as the torque transmission gain.

The transmission model calculates the gear ratio (transmission ratio). The gear ratio is a gear ratio determined by the virtual gear stage in the virtual transmission. In the calculation of the gear ratio, a map that defines the relationship between the gear ratio and the virtual gear stage is used. The transmission model calculates the transmission output torque using the gear ratio and the clutch output torque obtained from the map. The transmission output torque varies discontinuously in response to the change of the gear ratio. This discontinuous change in the transmission output torque causes a shift shock, which produces a vehicle design with a stepped transmission.

3.2 Second Configuration Example

Figure 6:
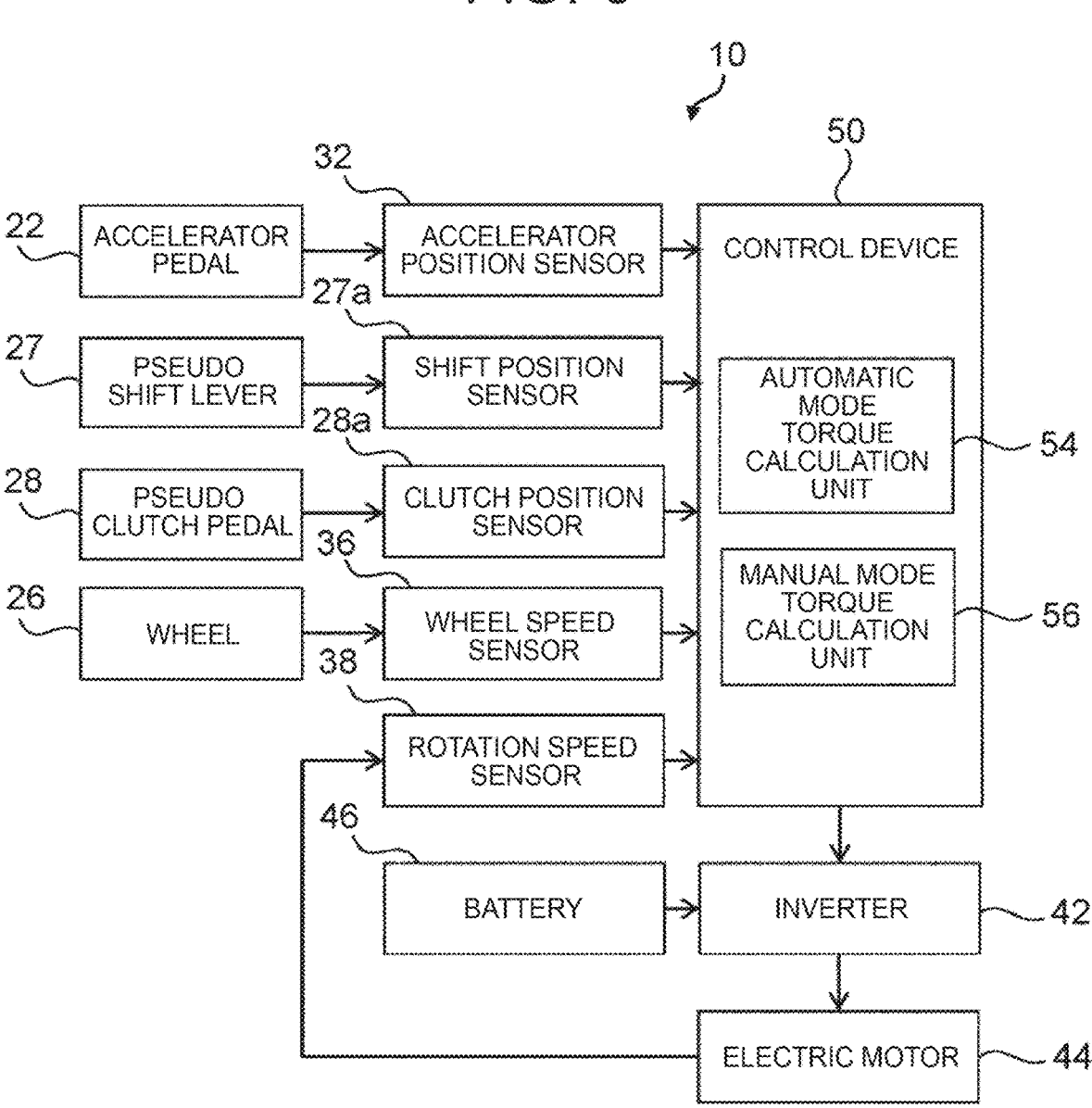
FIG. 6 is a diagram illustrating a second configuration example of a power control system of battery electric vehicle.

FIG. 6 is a diagram illustrating a second configuration example of the power control system of battery electric vehicle 10 according to the present embodiment. Here, only a configuration different from the above first configuration example will be described. Specifically, in the second configuration example, battery electric vehicle 10 includes a pseudo shift lever (pseudo shift device) 27 and a pseudo clutch pedal 28 instead of the sequential shifter 24 provided in the first configuration example. The pseudo shift lever 27 and the pseudo clutch pedal 28 are dummies different from the original shift lever and the clutch pedal.

The pseudo shift lever 27 has a configuration simulating a shift lever included in MT of the vehicles. The arrangement and the operating feeling of the pseudo shift lever 27 are equivalent to those of the actual MT vehicles. The pseudo shift lever 27 is provided with, for example, positions corresponding to the following gear stages: first gear, second gear, third gear, fourth gear, fifth gear, sixth gear, reverse, and neutral. The pseudo shift lever 27 is provided with a shift position sensor 27a that detects a gear stage by determining which position the pseudo shift lever 27 is in.

The pseudo clutch pedal 28 simulates a clutch pedal included in MT of the vehicles. The pseudo clutch pedal 28 is operated when the pseudo shift lever 27 is operated. The pseudo clutch pedal 28 is provided with a clutch position sensor 28a for detecting a depression amount of the pseudo clutch pedal 28.

The control device 50 receives signals from the accelerator position sensor 32, the shift position sensor 27a, the clutch position sensor 28a, the wheel speed sensor 36, and the rotation speed sensor 38. The control device 50 processes these signals and calculates a motor torque command for PWM controlling the inverter 42.

Similar to the first configuration example described above, the control device 50 includes an automatic mode and a manual mode as the control modes. The automatic mode is programmed to continuously change the output of the electric motor 44 in response to operation of the accelerator pedal 22. On the other hand, the manual mode is a control mode for driving battery electric vehicle 10 like MT vehicles. The manual mode is programmed to change the output and output characteristics of the electric motor 44 relative to the operation of the accelerator pedal 22 in response to the operation of the pseudo clutch pedal 28 and the pseudo shift lever (pseudo shift device) 27. That is, the manual mode is a control mode in which the output of the electric motor 44 can be changed in response to a driving operation of the vehicle component other than the accelerator pedal 22 or the brake pedal.

The vehicle model included in the manual mode torque calculation unit 56 is similar to that described above. However, the virtual clutch opening degree is replaced with the depression amount of the pseudo clutch pedal 28 detected by the clutch position sensor 28*a*. The virtual gear stage is determined by the position of the pseudo shift lever 27 detected by the shift position sensor 27*a*.

What is claimed is:

1. A battery electric vehicle that uses an electric motor as a traction power unit, the battery electric vehicle comprising:

an accelerator pedal;

a sequential shifter;

a speaker including an in-vehicle speaker that outputs a sound to inside of the battery electric vehicle and an outside speaker that outputs a sound to outside of the battery electric vehicle; and one or more processors configured to generate a pseudo engine sound and output the pseudo engine sound from the speaker, wherein the battery electric vehicle is switched between a manual mode and an automatic mode, the manual mode being a mode in which an output of the electric motor with respect to an operation of the accelerator pedal is changed according to a shift operation of the sequential shifter, the automatic mode being a mode in which the output of the electric motor is changed according to the operation of the accelerator pedal; and the one or more processors are configured to when a vehicle speed of the battery electric vehicle is higher than a first speed, output the pseudo engine sound from the in-vehicle speaker, but not from the outside speaker, when the vehicle speed of the battery electric vehicle is equal to or lower than the first speed, output the pseudo engine sound from both the in-vehicle speaker and the outside speaker, and when the battery electric vehicle is in the automatic mode, stop outputting the pseudo engine sound from the in-vehicle speaker, and output a notification sound different from the pseudo engine sound from the outside speaker when the vehicle speed of the battery electric vehicle is equal to or lower than the first speed.

2. The battery electric vehicle according to claim 1, wherein the one or more processors are further configured to, when the vehicle speed of the battery electric vehicle is equal to or lower than the first speed, acquire a noise level around the battery electric vehicle, and change a characteristic of the pseudo engine sound output from the outside speaker according to the noise level.

3. A vehicle management system applied to a battery electric vehicle including an accelerator pedal, a sequential shifter, a speaker, and an electric motor used as a traction power unit, the vehicle management system comprising one or more processors configured to generate a pseudo engine sound and output the pseudo engine sound from the speaker, wherein:

the speaker includes an in-vehicle speaker that outputs a sound to inside of the battery electric vehicle and an outside speaker that outputs a sound to outside of the battery electric vehicle;

the battery electric vehicle is switched between a manual mode and an automatic mode, the manual mode being a mode in which an output of the electric motor with respect to an operation of the accelerator pedal is changed according to a shift operation of the sequential shifter, the automatic mode being a mode in which the output of the electric motor is changed according to the operation of the accelerator pedal; and the one or more processors are configured to when a vehicle speed of the battery electric vehicle is higher than a first speed, output the pseudo engine sound from the in-vehicle speaker, but not from the outside speaker, when the vehicle speed of the battery electric vehicle is equal to or lower than the first speed, output the pseudo engine sound from both the in-vehicle speaker and the outside speaker, and when the battery electric vehicle is in the automatic mode, stop outputting the pseudo engine sound from the in-vehicle speaker, and output a notification sound different from the pseudo engine sound from the outside speaker when the vehicle speed of the battery electric vehicle is equal to or lower than the first speed.

* * * * *